United States Patent
Wang (10) Patent No.: US 8,792,372 B2
(45) Date of Patent: Jul. 29, 2014

(54) CARRIER-PHASE DIFFERENCE DETECTION WITH MISMATCHED TRANSMITTER AND RECEIVER DELAYS

(76) Inventor: Xiao-an Wang, Allentown, PA (US)

( * ) Notice: Subject to any disclaimer, the term of this patent is extended or adjusted under 35 U.S.C. 154(b) by 456 days.

(21) Appl. No.: 13/163,725

(22) Filed: Jun. 20, 2011

(65) Prior Publication Data

US 2012/0320765 A1    Dec. 20, 2012

(51) Int. Cl.
*G01R 31/08* (2006.01)

(52) U.S. Cl.
USPC ................................. 370/252; 370/332

(58) Field of Classification Search
None
See application file for complete search history.

(56) References Cited

U.S. PATENT DOCUMENTS

| | | | |
|---|---|---|---|
| 7,242,961 B2 | 7/2007 | Hansen | |
| 7,747,250 B2 | 6/2010 | Larsson et al. | |
| 7,778,607 B2 | 8/2010 | Withers, Jr. et al. | |
| 7,830,980 B2 | 11/2010 | Li et al. | |
| 7,978,649 B2 * | 7/2011 | Howard et al. | 370/329 |
| 2004/0085939 A1* | 5/2004 | Wallace et al. | 370/335 |
| 2004/0179627 A1* | 9/2004 | Ketchum et al. | 375/267 |
| 2006/0284725 A1* | 12/2006 | Naguib et al. | 340/7.39 |
| 2007/0133386 A1* | 6/2007 | Kim et al. | 370/203 |
| 2008/0292015 A1* | 11/2008 | Lee | 375/260 |
| 2009/0046800 A1* | 2/2009 | Xu et al. | 375/267 |
| 2009/0279512 A1* | 11/2009 | Fujishima et al. | 370/336 |
| 2009/0316627 A1* | 12/2009 | Fonseka et al. | 370/328 |
| 2010/0226451 A1* | 9/2010 | Park et al. | 375/260 |
| 2010/0239050 A1* | 9/2010 | Chang et al. | 375/324 |
| 2010/0265853 A1* | 10/2010 | Song et al. | 370/280 |
| 2010/0303015 A1* | 12/2010 | Ko et al. | 370/328 |
| 2011/0150049 A1* | 6/2011 | Dent | 375/219 |
| 2011/0235744 A1* | 9/2011 | Ketchum et al. | 375/295 |
| 2012/0176928 A1* | 7/2012 | Wallace et al. | 370/252 |
| 2013/0023285 A1* | 1/2013 | Markhovsky et al. | 455/456.1 |

* cited by examiner

*Primary Examiner* — Phirin Sam (57) ABSTRACT

Methods and apparatus are described that provide efficient detection of the carrier-phase difference (CPD) between communicating devices over the entire signal bandwidth. The CPD detection utilizes the linear structure of the CPD, which eliminates most of the feedback overhead. Both feedback mechanisms, compact digitized feedback, and feedback via fast signaling protocols, are described. The CPD can be decomposed into a fixed/slow-changing portion and a fast-varying portion, with the former being pre-calibrated and communicated prior to communications sessions, thus further reducing the feedback overhead and improving the CPD detection accuracy. The nonlinearity in the TX/RX chains can also be pre-calibrated, allowing CPDs with more general structures to be detected by methods that detect CPDs with linear structures. Applications of the described methods and apparatus include wireless multipoint broadcast systems, also known as coordinated multipoint transmission, or CoMP, in LTE-A (long-term evolution, advanced) systems, and frequency and phase synchronization of a cluster of base stations.

17 Claims, 4 Drawing Sheets

CARRIER-PHASE DIFFERENCE DETECTION WITH MISMATCHED TRANSMITTER AND RECEIVER DELAYS

BACKGROUND

1. Field of Application

The following description relates generally to telecommunications systems and wireless communications systems.

2. Prior Art

The data throughput of a wireless cellular network is the most important measure of the network performance. The higher the throughput, the more mobile users each cell in the network can serve, and the higher the data rate each user may have. A mobile user may have a very high peak throughput when it is very close to the base station. At cell edge, however, a mobile user may experience extremely low throughput due to interferences from other cells. Since statistically there are many more mobile users in the cell edge area than there are in the proximity of the base station, the average cell throughput can be much lower than the peak throughput. Typically the average cell throughput can be an order of magnitude below the peak throughput, or lower.

Figure 1:
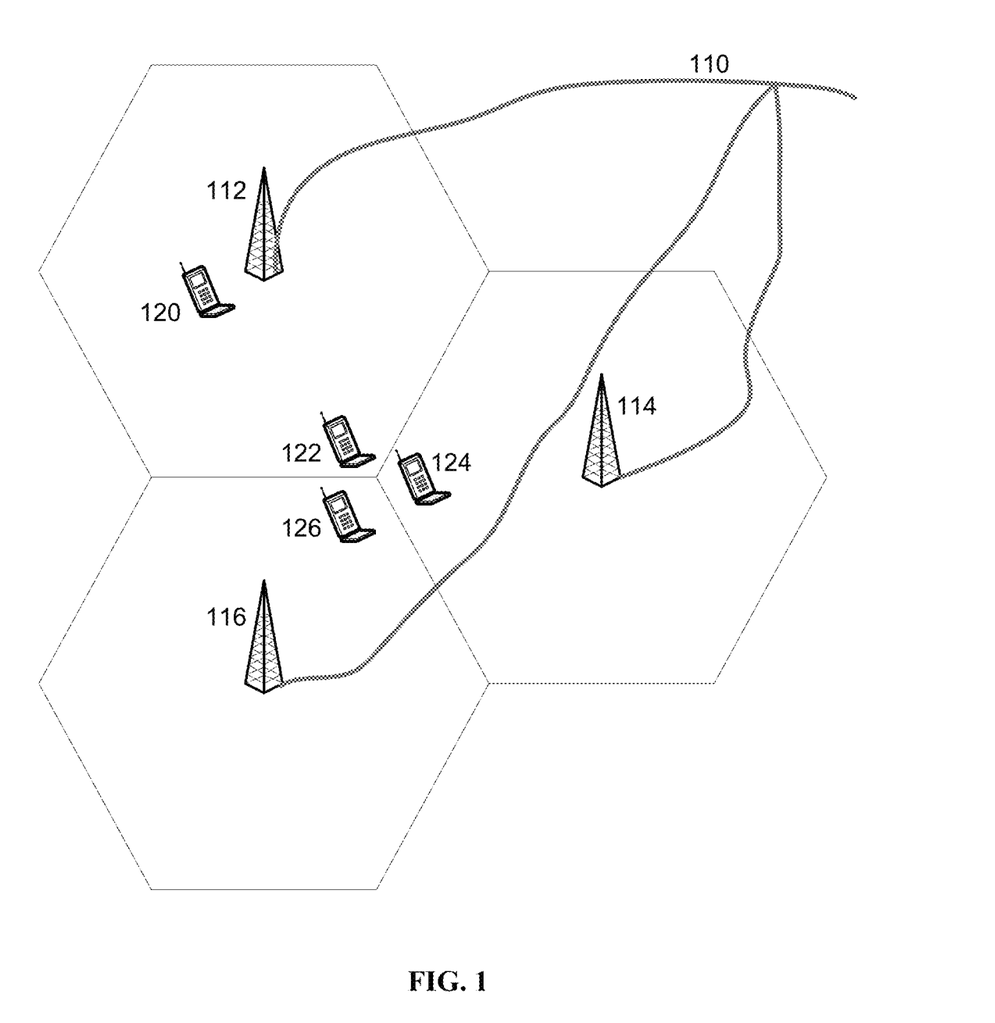
FIG. 1 illustrates a wireless cellular network that comprises a multipoint broadcast system.

Recently, in an effort to improve the network performance, multipoint broadcast or multipoint transmission schemes have been introduced to wireless cellular networks. An example is CoMP, or Coordinated Multi-Point transmission, in an LTE-A (long-term evolution of $3^{rd}$ generation of wireless cellular network, advanced) network. A multipoint broadcast scheme aims at increasing the cell-edge performance and can be described as follows. Refer to FIG. 1 where an example multipoint broadcast system can be identified. Base stations 112, 114, and 116 form a set of collaborating multipoint broadcasters. Mobile users 122, 124, and 126 form a set of recipients in the multipoint broadcast system. In the multipoint broadcast system in FIG. 1, base stations 112, 114, and 116 transmit the combinations of the signals intended for mobile users 122, 124, and 126. For each base station, the combination "weight" for each mobile user signal can be different. Through elaborate algorithms, the signals are combined at each base station in such a way that when the transmitted signals from base stations 112, 114, and 116 arrive at mobile user 122, the signals for mobile users 124 and 126 are cancelled out or minimized, while the signal for mobile user 122 is maximized or enhanced, thus the signal quality of mobile user 122 improves significantly. Similarly, mobile users 124 and 126 will also see significant improvement in the quality of their respective signals. The combining of the signals at each base station is commonly referred to as "pre-coding". The combining weights for each mobile-user signal and for each base station constitute the elements in a so called "pre-coding matrix".

In a cellular network, the channels from base stations to mobile users are referred to as the downlink, and the channels from mobile users to base stations are referred to as the uplink. In multipoint broadcasting, the downlink-channel information is required at the collaborating base stations. In an FDD (frequency-division duplex) network, such information is fed back by the mobile users via the uplink. The feedback overhead can be so large that the uplink capacity can be diminished. A TDD (time-division duplex) network can theoretically eliminate most of the feedback overhead by utilizing the channel reciprocity, i.e, the downlink and uplink channels are identical since the downlink and uplink share the same radio frequency. Thus base stations can obtain the downlink-channel information by estimating the uplink channel.

Channel reciprocity, however, applies only to the wireless channels between the antennas of base stations and mobile users. If base stations and mobile users have different transmitter (TX) and receiver (RX) characteristics, which is typically true, the reciprocity then does not exist in the overall channels between base stations and the mobile users, which includes the wireless channels between base station antennas and mobile user antennas, and TX and RX chains of base stations and mobile users. One approach to overcoming the non-reciprocity is to feed back the complete downlink-channel information via the uplink. This will incur the same feedback overhead as in FDD, but the remaining uplink capacity is even smaller since the total available uplink capacity is already reduced by the downlink traffic that shares the same frequency band with the uplink. Another approach is to "calibrate" the TX/RX differences. The calibration of base stations involves the following steps: (i) mobile users send pilot signals to base stations, (ii) base stations estimate uplink channels with pilot signals from mobile users, (iii) base stations send pilot signals to mobile users, (iv) mobile users estimate the downlink channel with pilot signals from base stations, (v) mobile users feed the complete downlink-channel information back to base stations, and (vi) base stations use the differences between downlink and uplink channels to calibrate the TX/RX mismatches. The calibration of mobile users can be done in a similar fashion.

The calibration approach, however, has several drawbacks that keep it from being a feasible solution. First, the calibration is a slow process due to extensive information feedback and calibration algorithms, which will suffer loss of fidelity under rapidly changing channel conditions. Second, some part of the TX/RX mismatches is fixed or slowly changing, and some part is relatively quick time-varying. The calibration can only compensate the fixed or slow-changing portion of the TX/RX mismatches, thus offers little help in removing the channel non-reciprocity. Third, even if the calibration is made to occur more often to track the quick time-varying portion of the RF mismatches, the feedback overhead will approach to that in FDD, since the standard calibration procedures require feedback of the complete channel information over the entire signal bandwidth, thus defeating the purpose of the calibration.

Without an effective and feasible method to compensate and to track the TX/RX mismatches, the benefits of multipoint broadcasting will be diminished by lack of accurate downlink-channel information and/or by high feedback overhead.

SUMMARY

The following is a summary of one or more aspects in order to provide a basic understanding of such aspects. Its purpose is to present some concepts of one or more aspects in a simplified form as a prelude to the more detailed descriptions that are presented later.

The non-reciprocity caused by TX/RX mismatches between a base station and a mobile user in a TDD system can be characterized by a complex function of frequency. The amplitude of the function characterizes gain mismatch, while the phase of the function characterizes the phase mismatch, referred to as the carrier-phase difference (CPD) hereinafter.

In accordance with one or more embodiments and the corresponding disclosure thereof, various aspects are described in connection with detecting the carrier-phase difference (CPD) between two wireless devices with RF mismatches. Consider a base station and a mobile user in a TDD network. A typical CPD can be modeled to be a linear function in frequency. Thus to detect the CPD over the entire signal bandwidth, the mobile user needs feed only two phase values at two different frequencies back to the base station, a tiny fraction of full downlink-channel information feedback.

Another aspect relates to improving accuracy of the CPD detection. The CPD feedback may include a multitude of frequency points such that the feedback overhead may still be much lower than the complete downlink-channel information feedback but the detection and estimation accuracy can be improved significantly.

Yet another aspect relates to the feedback mechanism that allows the base stations to track CPD changes in time. A mobile user can feed the downlink-channel phase information back via compact coded digitized data in an uplink data channel, or it can use a fast signaling protocol for downlink-channel phase feedback via an uplink pilot channel, which eliminates the delays of channel coding and decoding for uplink data channels. This, coupled with the low feedback overhead, allows shorter feedback cycle, which enables the base station track the CPD variations in time.

Still another aspect relates to further reduction in feedback overhead. The portion of the CPD, due to the fixed or slow-changing portion TX/RX mismatches, requires less frequent feedback. The fixed portion of the TX/RX characteristics of the mobile user can be "pre-calibrated" and sent to the base stations prior to a communications session, so that only one single phase value needs to be fed back during the communications session.

Yet another aspect relates to the capability of detecting the CPD with a more general structure than the linear model. The nonlinear portion of the TX/RX characteristics can also be "pre-calibrated" and sent to the base stations prior to a communications session, so that only the linear portion of the CPD needs to be detected.

DETAILED DESCRIPTION

The disclosed subject matter is described with reference to the drawings, wherein like reference numerals are used to refer to like elements throughout the description. In the following description, for purposes of explanation, specific details are set forth for the purpose of providing a thorough understanding of the subject innovation. It may be evident, however, that the disclosed subject matter may be practiced without these specific details.

Various terms are used to describe counterparts that are communicating with each other in various communications networks. For example, in a wireless cellular network, "base station" and "mobile user" are used. More generic terms, "reference device" and "non-reference device" are used in more general descriptions. The distinction between a reference device and a non-reference device is that a non-reference device can derive the desired information, e.g., the CPD, from the signals or data sent from the reference device. In the context of the CPD detection, a base station is a non-reference device, and a mobile user is a reference device. Accordingly, the channel from a non-reference device to a reference device is referred to as the "downlink" channel, and the channel from a reference device to a non-reference device is referred to as the "uplink" channel.

Figure 2:
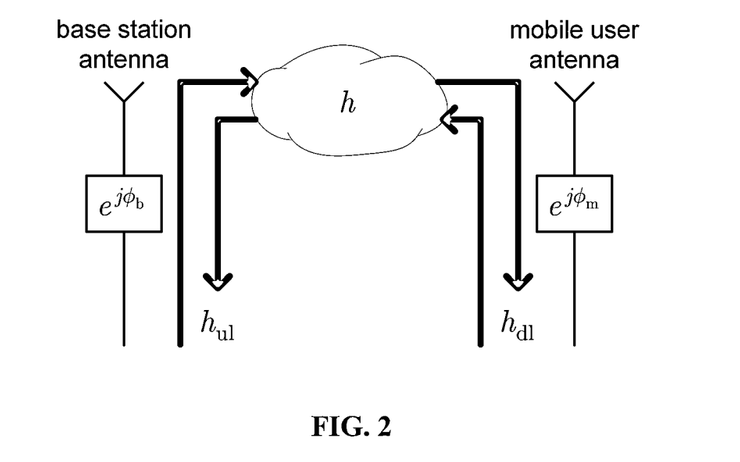
FIG. 2 illustrates a basic model for channel non-reciprocity.

FIG. 2 presents a basic model for the non-reciprocity of the channel caused by the TX/RX mismatches between a base station and a mobile user pair. Ignoring the gain mismatch, which can be calibrated and compensated separately, the TX/RX mismatches can be succinctly characterized by two random phases, carrier phase $\phi_b$ of the base station, and the carrier phase $\phi_m$ of the mobile user. The CPD is defined to be $\Delta\phi = \phi_b - \phi_m$. The downlink channel $h_{dl}$, the uplink channel $h_{ul}$, and the wireless channel h between the base station antenna and the mobile user antenna are related as follows:

$$h_{dl} = e^{j(\phi_b - \phi_m)} h$$

$$h_{ul} = e^{j(\phi_m - \phi_b)} h \quad (1)$$

Note that for a narrowband signal or a channel with flat fading, h is a complex scalar. For a wideband signal under a frequency-selective channel, h, $\phi_b$, and $\phi_m$ can be functions of frequency. From Eq. (1), the downlink channel $h_{dl}$ and the uplink channel $h_{ul}$ are related by $$h_{dl} = e^{j2(\phi_b - \phi_m)} h_{ul} = e^{j2\Delta\phi} h_{ul} \quad (2)$$

It is clear from Eqs. (1) and (2) that the downlink and uplink channels are no longer reciprocal with the presence of the TX/RX mismatches. It is also clear that the downlink channel $h_{dl}$ can be recovered from the uplink channel $h_{ul}$ once the CPD is known.

Figure 3:
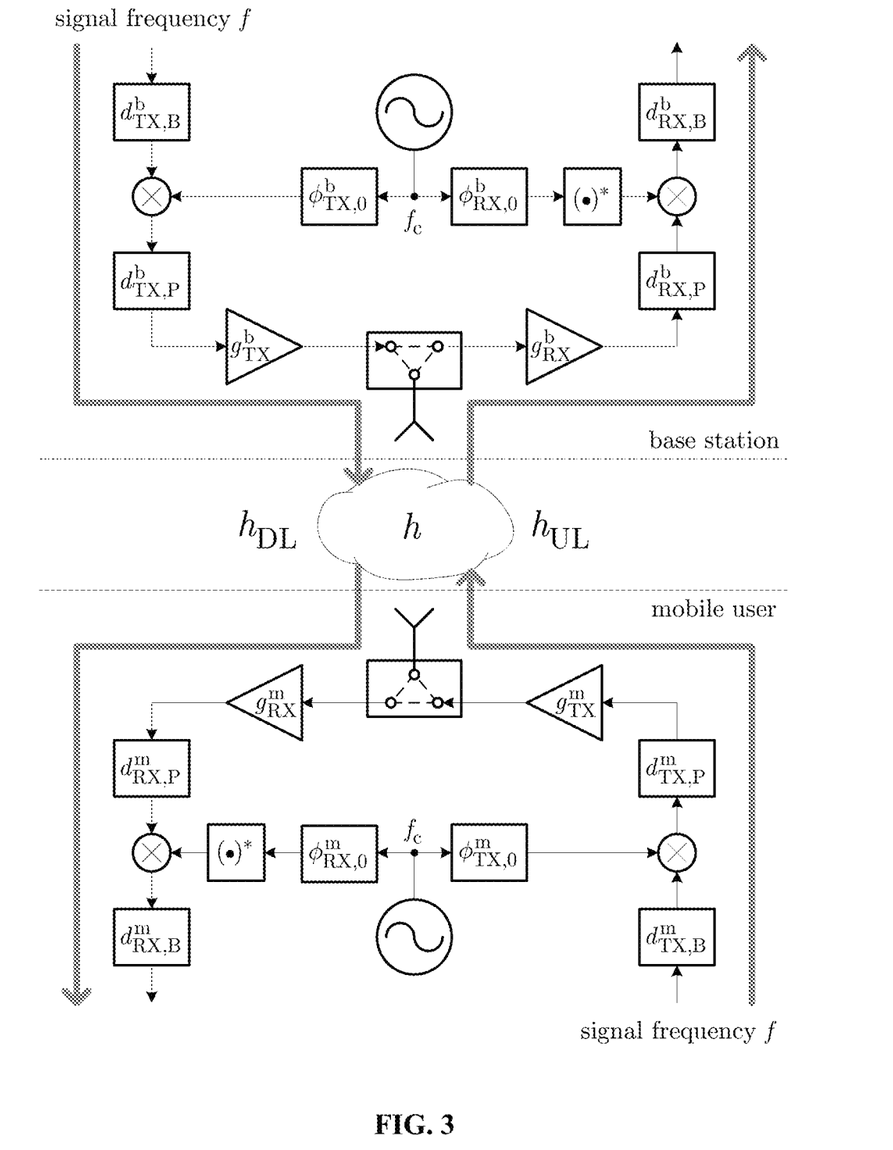
FIG. 3 illustrates a detailed model for channel non-reciprocity.

FIG. 3 presents a detailed model that reveals the underlying mathematical structure of the CPD. In the base station, $g_{TX}^b$ and $g_{RX}^b$ are the gains in the TX and RX chain, respectively, $d_{TX,B}^b$ and $d_{RX,B}^b$ are the delays in the TX and RX baseband processing, respectively, $d_{TX,P}^b$ and $d_{RX,P}^b$ are the delays in the TX and RX passband (non-baseband) processing, respectively, and $\phi_{TX,0}^b$ and $\phi_{RX,0}^b$ are the carrier phases for modulation and demodulation, respectively. The oscillator generates the carrier frequency $f_c$. Two derivative quantities, $d_{TX}^b$ and $d_{RX}^b$, denote the total delays in the TX and RX processing, respectively, and are defined as:

$$d_{TX}^b = d_{TX,B}^b + d_{TX,P}^b$$

$$d_{RX}^b = d_{RX,B}^b + d_{RX,P}^b \quad (3)$$

All the above quantities in the base station have their counterparts in the mobile user, with superscript "m" to denote the mobile user instead of "b" for the base station.

From FIG. 3, given the input signal with frequency f, the total phases $\phi_{TX}^b$ and $\phi_{RX}^b$ in the TX and RX chains of the base station can be seen to be $$\phi_{TX}^b = \phi_{TX,0}^b - 2\pi f_c d_{TX,P}^b - 2\pi f d_{TX}^b$$

$$\phi_{RX}^b = -\phi_{RX,0}^b - 2\pi f_c d_{RX,P}^b - 2\pi f d_{RX}^b \quad (4)$$

Similarly, $$\phi_{TX}^m = \phi_{TX,0}^m - 2\pi f_c d_{TX,P}^m - 2\pi f d_{TX}^m$$

$$\phi_{RX}^m = -\phi_{RX,0}^m - 2\pi f_c d_{RX,P}^m - 2\pi f d_{RX}^m \quad (5)$$

The downlink channel $h_{dl}$ and the uplink channel $h_{ul}$ are now related by $$h_{dl} = e^{j(\phi_{TX}^b - \phi_{RX}^b - \phi_{TX}^m + \phi_{RX}^m)} h_{ul} = e^{j2\Delta\phi} h_{ul} \quad (6)$$

The gain mismatches are again ignored under the assumption that they can be calibrated and compensated separately.

Compare Eq. (6) with Eq. (2), it can be seen that the basic model in FIG. 2 indeed includes the more elaborate model in FIG. 3 as a special case with $$\phi_b = \frac{1}{2}(\phi_{TX}^b - \phi_{RX}^b)$$

$$\phi_m = \frac{1}{2}(\phi_{TX}^m - \phi_{RX}^m) \quad (7)$$

and that the CPD is a linear function in signal frequency f:

$$\Delta\phi = \beta + \alpha f \quad (8)$$

where α depends only the delays in the TX/RX chains and can be considered fixed or rather slow-changing, and β includes the oscillator phases, phase noises, carrier frequency variations, etc. α and β are said to be the characterizing parameters of the CPD, which characterize the CPD as a function in frequency over the signal bandwidth. Note that α=0 if the uplink channel delay and the downlink channel delay are equal. It is β that makes the calibration approach ill-fitted with multipoint broadcasting schemes, since β varies much faster compared to α due to phase noises, carrier frequency adjustment by AFC (automatic frequency control), etc. Even if base stations and mobile users in a multipoint broadcast session are perfectly calibrated at some time t, the channel non-reciprocity can quickly reappear, and the slow nature of the calibration process will keep the base stations from being able to track the rapid channel changes in time.

Figure 4:
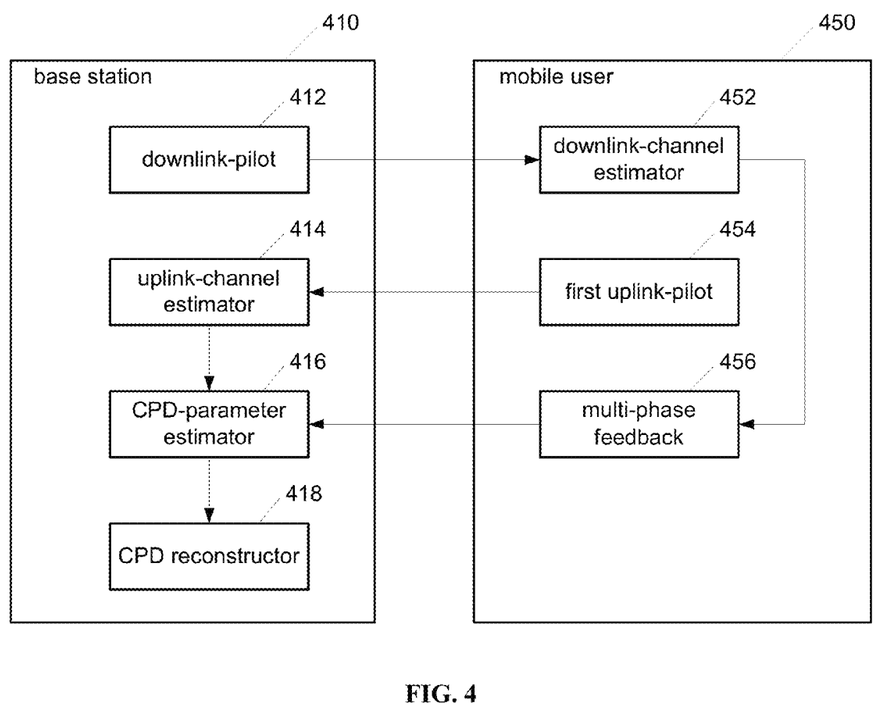
FIG. 4 illustrates an example system that uses digitized phase feedback for CPD detection.

FIG. 4 illustrates an example system that uses digitized phase feedback for CPD detection. Base station 410 comprises downlink-pilot apparatus 412, uplink-channel estimator 414, CPD-parameter estimator 416, and CPD reconstructor 418. Mobile user 450 comprises downlink-channel estimator 452, first uplink-pilot apparatus 454, and multi-phase feedback apparatus 456. Downlink-pilot apparatus 412 transmits a downlink pilot. Downlink-channel estimator 452 receives the downlink pilot to generate a downlink-channel estimate $\hat{h}_{dl}$. First uplink-pilot apparatus 454 transmits a first uplink pilot. Up-link-channel estimator 414 receives the first uplink pilot to generate an uplink-channel estimate $\hat{h}_{ul}$. Multi-phase feedback apparatus 456 sends a multitude of digitized downlink-channel phases at multiple frequencies. CPD-parameter estimator 416 receives the downlink-channel phases, and uses the downlink-channel phases and uplink-channel estimate $\hat{h}_{ul}$ to estimate the characterizing parameters α and β of the CPD. CPD reconstructor 418 reconstructs the CPD over the entire signal bandwidth with the CPD characterizing parameters.

In accordance with one or more embodiments, multi-phase feedback apparatus 456 transmits two downlink-channel phase estimates $\hat{\Phi}_{dl}(f_1)$ and $\hat{\Phi}_{dl}(f_2)$ to base station 410 at two frequencies $f_1$ and $f_2$. CPD-parameter estimator 416 uses the downlink-channel phase estimates from multi-phase feedback apparatus 456 and the uplink-channel phases from uplink-channel estimator 414 to estimate CPD parameters α and β as follows:

$$\hat{\Delta\phi}(f_1) = \frac{1}{2}[\hat{\Phi}_{dl}(f_1) - \hat{\Phi}_{ul}(f_1)] \quad (9)$$

$$\hat{\Delta\phi}(f_2) = \frac{1}{2}[\hat{\Phi}_{dl}(f_2) - \hat{\Phi}_{ul}(f_2)]$$

$$\hat{\alpha} = \frac{\hat{\Delta\phi}(f_1) - \hat{\Delta\phi}(f_2)}{f_1 - f_2}$$

$$\hat{\beta} = \frac{f_1 \hat{\Delta\phi}(f_2) - f_2 \hat{\Delta\phi}(f_1)}{f_1 - f_2}$$

CPD reconstructor 418 then reconstructs the CPD over the entire signal bandwidth according to $$\hat{\Delta\phi}(f) = \hat{\beta} + \hat{\alpha} f \quad (10)$$

Since only two downlink-channel phase estimates are needed for CPD detection over the entire signal bandwidth, the feedback overhead is reduced to a small fraction of what is needed for complete downlink-channel feedback, thus freeing up most of the uplink capacity. The much smaller feedback overhead and the simple CPD detection procedure described in Eqs. (9) and (10) allow much faster feedback rate so that rapid changes in channel conditions can be tracked.

Alternatively, more than two downlink-channel phase estimates can be fed back to the base station while still keeping the feedback overhead low. This helps to improve the accuracy of CPD-parameter estimation, which in turn, improves the accuracy of CPD detection. When more than two downlink-channel phase estimates are available, numerous algorithms are available with various optimization criteria, for instance, least-square (LS) curve-fitting, for CPD parameter estimator 416 to use in estimating α and β.

The choice of the frequencies also impacts the accuracy of CPD detection. For example, consider the case where two downlink-channel phase estimates are used. Under typical conditions, best accuracy can be achieved when $|f_1 - f_2|$ takes the maximally allowed value.

The downlink-channel phase estimates can be quantized in such a way to further reduce the size of the data. For example, instead of sending the real and imaginary part of $e^{j\hat{\Phi}_{dl}}$, the unit circle can be quantized to a finite number of regions, and the index of the region which $e^{j\hat{\Phi}_{dl}}$ falls into is sent instead. Only a few bits, for instance, 8 bits or less, may be needed for the index. Other data compression techniques can also be applied to the downlink-channel phase estimates.

It is to be appreciated that the feedback data from multi-phase feedback apparatus 456 can be any function of the downlink-channel phase estimate, which assists the base station to derive the CPD and/or downlink-channel information.

Figure 5:
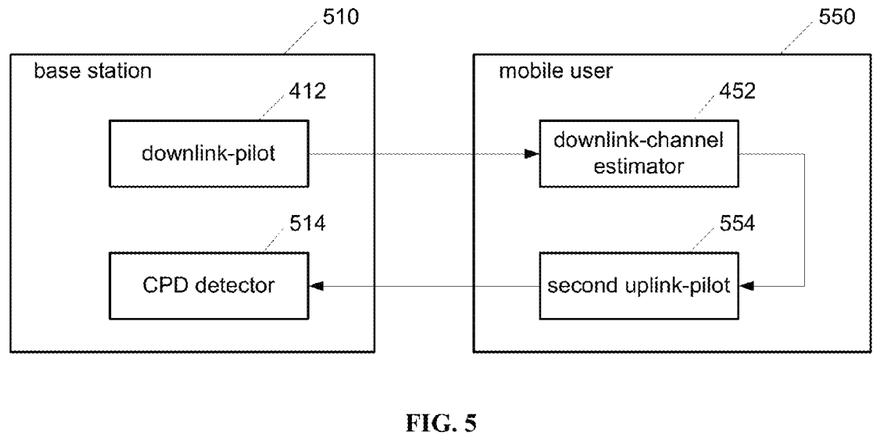
FIG. 5 illustrates an example system that uses an exemplary signaling protocol for CPD detection.

FIG. 5 illustrates an example system that uses an exemplary signaling protocol for CPD detection. In contrast to digitized feedback, where the downlink-channel phases are sent to base stations in a coded data form in an uplink data channel, a signaling protocol uses a known pilot in an uplink pilot channel to "embed" the downlink-channel phase information to be sent to base stations in a predetermined manner. In FIG. 5, base station 510 comprises downlink-pilot apparatus 412, and CPD detector 514. Mobile user 550 comprises downlink-channel estimator 452, and second uplink-pilot apparatus 554. Downlink-pilot apparatus 412 transmits a downlink pilot. Downlink-channel estimator 452 receives the downlink pilot to generate a downlink-channel estimate $\hat{h}_{dl}$. Second uplink-pilot apparatus 554 transmits a second uplink pilot that embeds the information on the phases of the downlink-channel estimate $\hat{h}_{dl}$. CPD detector 514 receives the second uplink pilot and detects the CPD.

In one embodiment, the OFDM (orthogonal frequency-division multiplexing) transmission is used between base stations and mobile users. Second uplink-pilot apparatus 554 transmits a second uplink pilot on two pilot subcarriers at two frequencies $f_1$ and $f_2$. The pilot symbols $P_1$ and $P_2$ on $f_1$ and $f_2$ are given by $$P_1 = e^{-j\hat{\Phi}_{dl}(f_1)} Q_1$$

$$P_2 = e^{-j\hat{\Phi}_{dl}(f_2)} Q_2 \quad (11)$$

where $Q_1$ and $Q_2$ are known symbols, and $\hat{\Phi}_{dl}(f_1)$ and $\hat{\Phi}_{dl}(f_2)$ are the phases from the downlink channel estimate $\hat{h}_{dl}$ at frequencies $f_1$ and $f_2$, respectively. It can be seen from Eq. (11) that the downlink-channel phases are embedded into the pilot symbols. CPD detector 514 receives the second uplink pilot and removes the known symbols $Q_1$ and $Q_2$. Ignoring the uplink channel noise, the phases of the second uplink pilot after removal of $Q_1$ and $Q_2$ are $$\Phi_{ul}(f_1) - \hat{\Phi}_{dl}(f_1) \doteq -2\widehat{\Delta\phi}(f_1)$$

$$\Phi_{ul}(f_2) - \hat{\Phi}_{dl}(f_2) \doteq -2\widehat{\Delta\phi}(f_2) \quad (12)$$

From Eq. (12), CPD detector can estimate CPD characterizing parameters $\alpha$ and $\beta$ according to Eq. (9). Once $\alpha$ and $\beta$ are estimated, the CPD over the entire signal bandwidth is then known according to Eq. (10). As in the case of digitized feedback, the choice of the frequencies impacts the accuracy of the CPD detection. For two pilot subcarriers, the detection accuracy is generally maximized when $|f_1 - f_2|$ takes the maximally allowed value.

Since only two subcarriers are needed for CPD detection, the overhead of the signaling protocol can be very small, as an OFDM wireless network typically employs a large number of subcarriers. For example, an LTE system can have more than 1200 subcarriers. Thus more than two pilot subcarriers can be used in the signaling protocol while still keeping the usage of subcarrier resources low. When more than two pilot subcarriers are available in the signaling protocol, CPD detector 516 can choose from a wide variety of the algorithms according to various optimization criteria to estimate $\alpha$ and $\beta$, and to detect the CPD.

In another embodiment, a single-carrier (such as CDMA, code-division multiple access) transmission is used between base stations and mobile users. Second uplink-pilot apparatus 554 transmits a second uplink pilot. The frequency domain representation $P(f)$ of the second uplink pilot satisfies $$P(f) = e^{-j\hat{\Phi}_{dl}(f)} Q(f) \quad (13)$$

at the frequencies represented by the values of $f$ within the signal bandwidth. It can be seen from Eq. (13) that the downlink-channel phases are embedded into the second uplink pilot. It should be noted that $f$ may assume all possible values, or it may assume only certain values, within the signal bandwidth. $Q(f)$ is the frequency-domain representation of a known pilot-symbol sequence, and $\hat{\Phi}_{dl}(f)$ is the phase function from the downlink channel estimate $\hat{h}_{dl}$. CPD detector 514 receives the second uplink pilot and removes the known spectrum $Q(f)$. Ignoring the uplink channel noise, the phase function of the second uplink pilot after removal of $Q(f)$ is $$\Phi_{ul}(f) - \hat{\Phi}_{dl}(f) \doteq -2\widehat{\Delta\phi}(f) \quad (14)$$

which is twice the negative of the CPD over the entire signal bandwidth.

When the frequency $f$ assumes all possible values in the signal bandwidth, it may not be necessary to estimate $\alpha$ and $\beta$ since the CPD can be obtained from Eq. (14) for any frequency $f$. In many cases, however, it may still be desirable to estimate $\alpha$ and $\beta$. The reason is as follows. If Eq. (8) accurately models the structure of the CPD, then the accuracy of the CPD detection can be much improved by estimating $\alpha$ and $\beta$, and then by using Eq. (10) as the CPD estimate, as opposed to using Eq. (14). The value of the CPD from Eq. (14) at each frequency can be noisy, but using all available values from Eq. (14) to estimate $\alpha$ and $\beta$ has the effect of an averaging filter that removes most of the noises. Numerous algorithms are available with various optimal criteria for estimating $\alpha$ and $\beta$ from Eq. (14) with multiple frequency values.

The feedback by the signaling protocol is fast since the downlink-channel phase information is directly embedded in an uplink pilot, therefore eliminating the needs for error-control coding and decoding that is required in the digitized feedback in an uplink data channel, and eliminating the delays associated with coding and decoding operations.

Given the downlink-channel phase estimation $\hat{\Phi}_{dl}(f)$, the expression $e^{-j\hat{\Phi}_{dl}(f)}$ is referred to as its conjugate phasor. It is to be appreciated, however, that Eqs. (11) and (13) can be generalized to $$P_1 = g(\hat{\Phi}_{dl}(f_1)) Q_1$$

$$P_2 = g(\hat{\Phi}_{dl}(f_2)) Q_2 \quad (15)$$

and $$P(f) = g(\hat{\Phi}_{dl}(f)) Q(f) \quad (16)$$

respectively, where $g(\bullet)$ can be any function of its argument, which, when the argument is the downlink-channel phase estimate, assists the base stations to detect the CPD, and/or to derive the downlink-channel information.

The linear term $\alpha f$ of the CPD in Eq. (8) is due to the delays in TX/RX chains of the base station and the mobile users. If the delays are fixed, they can be calibrated and stored in respective devices (base stations or mobile users). In multipoint broadcasting, a mobile user can send its stored delay profile to collaborating base stations prior to a multipoint broadcast session. The mobile user can also send the base stations updates on its delay profile under the condition that the changes in the delay profile become non-negligible, or that the elapsed time reaches a threshold to trigger an update, etc. A base station can similarly update its own delay profile if similar conditions are met. The base station will then have the full knowledge of the $\alpha f$ portion of the CPD by combining the delay profile of the mobile user and the delay profile of its own. One advantage of this is that the feedback overhead can be further reduced, since only one downlink-channel phase value is needed for CPD detection during normal feedback, as opposed to at least two downlink-channel phases. Another advantage is the CPD detection accuracy can be improved, since only one parameter $\beta$ needs to be estimated, as opposed to two parameters $\alpha$ and $\beta$, from the same number of downlink-channel phase estimates.

There may be situations where the TX/RX processing includes elements with non-linear phases in some devices. Thus a delay profile can be broken into two parts: the linear delay profile, and the non-linear delay profile. The non-linear delay profile is usually referred to as the non-linear phase profile. Linear delay profile, on the other hand, is sometimes simply referred to as the delay profile, if the context is clear. The non-linear phase characteristics can also be calibrated and stored in respective devices. In multipoint broadcasting, a mobile user can send its stored non-linear phase profile to collaborating base stations prior to a multipoint broadcast session. The mobile user can also send the base stations updates on its non-linear phase profile under the condition that the changes in the non-linear profile become non-negligible, or that the elapsed time reaches a threshold to trigger an update, etc. A base station can similarly update its own non-linear phase profile if similar conditions are met. The base station then will have the full knowledge of the non-linear phase profile of the CPD by combining the non-linear phase profile of the mobile user and the non-linear phase profile of its own. The base station can apply one or more embodiments to detect the linear portion $\beta + \alpha f$ of the CPD, and then combine the linear and non-linear portions to complete the CPD detection.

The delay profile and the non-linear phase profile can be parameterized and/or indexed to minimize the size of data for describing the profiles. For example, a profile can be described by an index to the category it belongs to, or by a collection of parameters, or by the combination of both. Other data compression techniques can also be applied to the delay and non-linear phase profiles.

The accuracy of the CPD detection can be further improved by time-domain filtering or averaging. If the rate of the feedback or the signaling protocol is faster than the rate change of the channel, then consecutive values of the CPD estimates can be correlated. Filtering can then be applied to the time series made of the time-domain CPD estimates, which further reduces the estimation noises. If filtering is applied to parameter estimates $\hat{\alpha}$ and $\hat{\beta}$, it can be advantageous to use different filters on $\alpha$ and $\beta$. For example, $\alpha$ is generally changing much slower than $\beta$ or not changing at all, thus the filter on $\alpha$ can be much narrower than the filter on $\beta$. This ensures that the estimation quality for $\alpha$ and $\beta$ can be individually optimized, and the overall CPD detection quality can therefore be improved.

CONCLUSION, RAMIFICATIONS, AND SCOPE

Due to the TX/RX mismatches between base stations and mobile users, the downlink and uplink channels are no longer reciprocal in a TDD network. The knowledge of the carrier-phase difference (CPD) between a base station and a mobile user is critical to multipoint broadcasting, since it allows the base stations to recover downlink channels from uplink channels. If the downlink channel delay and the uplink channel delay are different due to the TX/RX mismatch, the CPD also varies with the signal frequency. For example, in an OFDM system, the CPD on one subcarrier can be different from the CPD on another subcarrier. Existing solutions such as the calibration approach require the feedback of complete channel information, resulting large feedback overhead that diminishes the uplink capacity and thus negating the advantages of multipoint broadcasting in a TDD network. The calibration process is also very slow, which makes it difficult or impossible to track the fast-changing portion of the CPD.

Accordingly, it will be seen that the CPD detection of various embodiments offers an effective solution to detecting the CPD with TX/RX mismatches. By utilizing the underlying mathematical structure of the CPD model, the feedback overhead is made to be a tiny fraction of the full channel feedback. The CPD detection over the entire signal bandwidth via parameter estimation is very efficient. Low feedback overhead and efficient detection processing make the CPD detection a practical and feasible solution to successful implementation of multipoint broadcasting schemes in wireless cellular networks.

The CPD feedback uses either compact coded data or a signaling protocol. Compact coded data further reduces feedback overhead. In an LTE network, the fast signaling protocol can use as few as two subcarriers for CPD signaling out of over a thousand available subcarriers, a very low resource usage. The fast signaling protocol also reduces the feedback turn-around time by eliminating the need for coding and decoding of error-control codes. The low feedback or signaling overhead allows faster feedback rate to track the time-varying CPD, and preserves most of the uplink capacity.

The feedback overhead can still be further reduced by separating the fixed or slow-changing portion from the fast-varying portion of the CPD. Fixed portion of the CPD can be communicated just once prior to a communications session. Slow-changing portion of the CPD can be updated less often.

The separation of the fixed and/or slow-changing portion of the CPD overcomes the difficulty posed by the nonlinear characteristics of the CPD. Since the nonlinear delay or phase profiles are either fixed or slow-changing in typical communication devices, such non-linear characteristics can be pre-calibrated and communicated prior to a multipoint broadcast session if they are fixed, or can be updated infrequently should they ever change. The base stations can now apply various embodiments to the linear portion of the CPD, and the complete CPD detection is accomplished by combining the linear and nonlinear portions of the CPD.

The accuracy of the CPD detection can be significantly improved by feeding more data back while still keeping the feedback overhead low. The accuracy can be further improved by time-domain filtering of a series of detected CPD values or series of estimated CPD parameters.

It is to be understood and appreciated that claimed subject matter herein is not limited to wireless networks. For example, a vectored DSL (digital subscriber line) TDD system can be similarly modeled as a multipoint transmission system. Thus CPD detection over the entire signal bandwidth, which is critical for the downlink channel acquisition, can be achieved in the same way as described in this application. Another application can be the synchronization of a system of devices linked by wired connections, such as cables or optical fibers. An example of such a system is a set of base stations in a wireless cellular network connected by high-speed backbones, where one or more base stations are designated as reference devices from which the other base stations, or non-reference devices, derive the CPDs to get synchronized in phase or in frequency.

While various aspects or features have been illustrated and described herein, many modifications, substitutions, changes, and equivalents will now occur to those skilled in the art. It is, therefore, to be understood that the appended claims are intended to cover all such modifications and changes as fall within the true spirit and the scope of the disclosed subject matter.

What is claimed is:

1. A method for communications in a network with a predetermined signal bandwidth, having at least one reference device and at least one non-reference device, comprising:
   (a) sending a downlink-pilot signal via a downlink channel from said non-reference device to said reference device,
   (b) generating a downlink-channel estimate at said reference device from said downlink-pilot signal,
   (c) sending a first uplink-pilot signal via an uplink pilot channel from said reference device to said non-reference device,
   (d) generating an uplink-channel estimate at said non-reference device from said uplink-pilot signal,
   (e) sending a plurality of estimates of values of a function of the downlink-channel phase from said reference device to said non-reference device via an uplink data channel,
   (f) modeling the carrier-phase difference (CPD) between said non-reference device and said reference device as a CPD function of the frequency over said predetermined signal bandwidth, said function of the frequency being completely characterized by a plurality of characterizing parameters, and
   (g) determining said CPD by estimating said characterizing parameters of said CPD function of the frequency over said signal bandwidth from said estimates of said values of said function of the downlink-channel phase received by said non-reference device, and from said uplink-channel estimate, whereby said non-reference device has obtained complete knowledge of said CPD over said signal bandwidth.

2. The method of claim 1, wherein said reference device is a mobile user and said non-reference device is a base station.

3. The method of claim 1, wherein said function of the downlink-channel phase is the downlink-channel phase itself.

4. The method of claim 1, wherein sending said plurality of said estimates of said values of said function of the downlink-channel phase further comprises:
   (a) compressing said estimates to reduce the size of data to be sent, and
   (b) sending the compressed data.

5. The method of claim 1, wherein determining said CPD by estimating said characterizing parameters of said CPD over said signal bandwidth further comprises:
   (a) modeling said CPD function as a linear function of the frequency over said signal bandwidth,
   (b) estimating parameters of said linear function from said estimates of values of said function of the downlink-channel phase, and from said uplink-channel estimate, and
   (c) reconstructing said CPD with said parameters of said linear function of the frequency over said signal bandwidth.

6. The method of claim 5, wherein estimating said parameters of said linear function further comprises choosing the frequencies, at which said estimates of values of said function of the downlink-channel phase are estimated, so that the estimation accuracy of said parameters of said linear function is optimized or improved.

7. A method for communications in a network with a predetermined signal bandwidth, having at least one reference device and at least one non-reference device, comprising:
   (a) sending a downlink-pilot signal via a downlink channel from said non-reference device to said reference device,
   (b) generating a downlink-channel estimate at said reference device from said downlink-pilot signal,
   (c) embedding a plurality of the downlink-channel phase estimates in a second uplink pilot,
   (d) sending said second uplink pilot from said reference device to said non-reference device via an uplink-pilot channel, and
   (e) determining the carrier-phase difference (CPD) over said signal bandwidth from said plurality of said downlink-channel phase estimates, embedded in said second uplink pilot received by said non-reference device,
whereby said non-reference device has obtained complete knowledge of said CPD over said signal bandwidth.

8. The method of claim 7, wherein embedding said plurality of said downlink-channel phase estimates in said second uplink pilot further comprises:
   (a) computing a frequency-domain representation of a known pilot-symbol sequence, and
   (b) multiplying said frequency-domain representation of said known pilot symbol sequence by said plurality of the downlink-channel phase estimates,
whereby the product of the multiplication is the frequency-domain representation of said second uplink pilot.

9. The method of claim 8, wherein said frequency-domain representation of said known pilot-symbol sequence is said known pilot-symbol sequence over a set of pilot subcarriers in an OFDM (orthogonal frequency-division multiplexing) transmission system.

10. The method of claim 9, wherein said frequency-domain representation of said known pilot-symbol sequence is the spectrum of said known pilot-symbol sequence in a single-carrier transmission system.

11. A method for communications in a network with a predetermined signal bandwidth, having at least one reference device and at least one non-reference device, comprising:
   (a) calibrating and storing a fixed/slow-changing portion of the TX/RX delay profile of said reference device prior to a communications session,
   (b) calibrating and storing a fixed/slow-changing portion of the TX/RX delay profile of said non-reference device prior to said communications session,
   (c) sending said fixed/slow-changing portion of the TX/RX delay profile of said reference device to said non-reference device prior to said communications session,
   (d) determining a fixed/slow-changing portion of a carrier-phase difference (CPD) over said signal bandwidth from said fixed/slow-changing portion of the TX/RX delay profile of said reference device and from said fixed/slow-changing portion of the TX/RX delay profile of said non-reference device,
   (e) sending a downlink-pilot signal via a downlink channel from said non-reference device to said reference device,
   (f) generating a downlink-channel estimate at said reference device from said downlink-pilot signal,
   (g) sending a first uplink-pilot signal via an uplink pilot channel from said reference device to said non-reference device,
   (h) generating an uplink-channel estimate at said non-reference device from said uplink-pilot signal,
   (i) sending at least one estimate of values of a function of the downlink-channel phase from said reference device to said non-reference device via an uplink data channel,
   (j) determining a fast-changing portion of said CPD over said signal bandwidth from said estimates of said values of said function of the downlink-channel phase received by said non-reference device, and from said uplink-channel estimate, and
   (k) determining said CPD from said fixed/slow-varying portion of said CPD and from said fast-changing portion of said CPD.

12. The method of claim 11, wherein sending said fixed/slow-changing portion of the TX/RX delay profile further comprises:
   (a) compressing said fixed/slow-changing portion of the TX/RX delay profile to reduce the size of data to be sent, and
   (b) sending the compressed data.

13. The method of claim 11, wherein said fixed/slow-changing portion of the TX/RX delay profile of said reference device comprises a non-linear phase profile of said reference device, and said fixed/slow-changing portion of the TX/RX delay profile of said non-reference device comprises a non-linear phase profile of said non-reference device.

14. The method of claim 11, further comprising:
   (a) re-calibrating and storing said fixed/slow-changing portion of the TX/RX delay profile of said reference device when a first set of conditions is met,
   (b) re-calibrating and storing said fixed/slow-changing portion of the TX/RX delay profile of said non-reference device when a second set of conditions is met,
   (c) sending an update of said fixed/slow-changing portion of the TX/RX delay profile of said reference device to said non-reference device when said first set of conditions is met, and
   (d) re-determining said fixed/slow-changing portion of said CPD over said signal bandwidth from said fixed/slow-changing portion of the TX/RX delay profile of said reference device and from said fixed/slow-changing portion of the TX/RX delay profile of said non-reference device.

15. A method for communications in a network with a predetermined signal bandwidth, having at least one reference device and at least one non-reference device, comprising:
   (a) calibrating and storing a fixed/slow-changing portion of the TX/RX delay profile of said reference device prior to a communications session,
   (b) calibrating and storing a fixed/slow-changing portion of the TX/RX delay profile of said non-reference device prior to said communications session,
   (c) sending said fixed/slow-changing portion of the TX/RX delay profile of said reference device to said non-reference device prior to said communications session,
   (d) determining a fixed/slow-changing portion of a carrier-phase difference (CPD) over said signal bandwidth from said fixed/slow-changing portion of the TX/RX delay profile of said reference device and from said fixed/slow-changing portion of the TX/RX delay profile of said non-reference device,
   (e) sending a downlink-pilot signal via a downlink channel from said non-reference device to said reference device,
   (f) generating a downlink-channel estimate at said reference device from said downlink-pilot signal,
   (g) embedding at least one estimate of values of a function of the downlink-channel phase in a second uplink pilot at said reference device,
   (h) sending said second uplink-pilot signal from said reference device to said non-reference device via an uplink-pilot channel, and
   (i) determining a fast-changing portion of said CPD over said signal bandwidth from said second uplink pilot received by said non-reference device, and
   (j) determining said CPD from said fixed/slow-varying portion of said CPD and said fast-changing portion of said CPD.

16. The method of claim 15, wherein said fixed/slow-changing portion of the TX/RX delay profile of said reference device comprises a non-linear phase profile of said reference device, and said fixed/slow-changing portion of the TX/RX delay profile of said non-reference device comprises a non-linear phase profile of said non-reference device.

17. The method of claim 15, further comprising:
   (a) re-calibrating and storing said fixed/slow-changing portion of the TX/RX delay profile of said reference device when a first set of conditions is met,
   (b) re-calibrating and storing said fixed/slow-changing portion of the TX/RX delay profile of said non-reference device when a second set of conditions is met,
   (c) sending an update of said fixed/slow-changing portion of the TX/RX delay profile of said reference device to said non-reference device when said first set of conditions is met, and
   (d) re-determining said fixed/slow-changing portion of said CPD over said signal bandwidth from said fixed/slow-changing portion of the TX/RX delay profile of said reference device and from said fixed/slow-changing portion of the TX/RX delay profile of said non-reference device.

* * * * *